United States Patent [19]
Brown

[11] Patent Number: 5,676,747
[45] Date of Patent: Oct. 14, 1997

[54] CALCIUM CARBONATE PIGMENTS FOR COATING PAPER AND PAPER BOARD

[75] Inventor: Alan J. Brown, Vancouver, Wash.

[73] Assignee: Columbia River Carbonates, Woodland, Wash.

[21] Appl. No.: 580,762

[22] Filed: Dec. 29, 1995

[51] Int. Cl.⁶ .................................................. C09C 1/02
[52] U.S. Cl. ...................... 106/465; 106/416; 106/419; 106/437; 106/445; 106/447; 106/448; 106/460; 106/464; 106/471; 106/491; 162/135
[58] Field of Search ................................... 106/464, 465, 106/416, 437, 419, 491, 471, 460, 445, 447, 448; 162/135

[56] References Cited

U.S. PATENT DOCUMENTS

| | | | |
|---|---|---|---|
| 2,176,876 | 10/1939 | Alessandroni | 106/422 |
| 3,014,836 | 12/1961 | Proctor, Jr. | 162/181.8 |
| 3,663,461 | 5/1972 | Witt | 528/405 |
| 3,804,656 | 4/1974 | Kaliski et al. | 106/487 |
| 4,026,726 | 5/1977 | Carney | 136/202 |
| 4,028,173 | 6/1977 | Olson | 162/181.2 |
| 4,076,548 | 2/1978 | Bundy et al. | 106/416 |
| 4,078,941 | 3/1978 | Bundy et al. | 106/409 |
| 4,115,187 | 9/1978 | Davidson | 162/168.7 |
| 4,167,420 | 9/1979 | Linden et al. | 106/447 |
| 4,167,421 | 9/1979 | Linden et al. | 106/447 |
| 4,174,279 | 11/1979 | Clark et al. | 210/736 |
| 4,381,948 | 5/1983 | McConnell et al. | 106/416 |
| 4,610,801 | 9/1986 | Matthews et al. | 252/181 |
| 4,714,603 | 12/1987 | Vanderheiden | 423/432 |
| 4,732,748 | 3/1988 | Stewart et al. | 423/430 |
| 4,738,726 | 4/1988 | Pratt et al. | 106/487 |
| 4,775,420 | 10/1988 | Gonnet et al. | 106/461 |
| 4,824,654 | 4/1989 | Ota et al. | 423/432 |
| 4,888,160 | 12/1989 | Kosin et al. | 423/430 |
| 4,892,590 | 1/1990 | Gill et al. | 106/214.01 |
| 4,900,533 | 2/1990 | Malden | 423/430 |
| 4,943,324 | 7/1990 | Bundy et al. | 106/486 |
| 5,006,574 | 4/1991 | Sennett et al. | 523/351 |
| 5,068,276 | 11/1991 | Suitch et al. | 524/413 |
| 5,076,846 | 12/1991 | Buri et al. | 106/40 |
| 5,082,887 | 1/1992 | Brown et al. | 524/413 |
| 5,112,782 | 5/1992 | Brown et al. | 501/144 |
| 5,116,418 | 5/1992 | Kaliski | 106/419 |
| 5,152,835 | 10/1992 | Nemeh | 106/437 |
| 5,169,441 | 12/1992 | Lauzon | 106/416 |
| 5,203,918 | 4/1993 | Rice | 106/468 |
| 5,207,822 | 5/1993 | Manasso et al. | 106/416 |
| 5,236,989 | 8/1993 | Brown et al. | 524/413 |
| 5,261,956 | 11/1993 | Dunaway et al. | 106/416 |
| 5,279,663 | 1/1994 | Kaliski | 106/486 |
| 5,298,066 | 3/1994 | Shurling, Jr. et al. | 106/487 |
| 5,317,053 | 5/1994 | Brown et al. | 524/425 |
| 5,320,672 | 6/1994 | Whalen-Shaw | 106/468 |
| 5,336,311 | 8/1994 | Curtis et al. | 106/416 |
| 5,384,013 | 1/1995 | Husband et al. | 162/168.1 |
| 5,454,864 | 10/1995 | Whalen-Shaw | 106/437 |

FOREIGN PATENT DOCUMENTS

| | | |
|---|---|---|
| 2016498 A | 9/1979 | United Kingdom . |
| 2125838 A | 3/1984 | United Kingdom . |
| WO91/08341 | 6/1991 | WIPO . |

OTHER PUBLICATIONS

Passaretti, et al., "Application of High–Opacity Precipitated Calcium Carbonate," *Tappi Journal* 76:135–140 (1993).

*Primary Examiner*—Mark L. Bell
*Assistant Examiner*—Scott L. Hertzog
*Attorney, Agent, or Firm*—Klarquist Sparkman Campbell Leigh & Whinston, LLP

[57] ABSTRACT

A method for producing structured calcium carbonate pigments for coating paper is disclosed. An aqueous slurry of anionically dispersed calcium carbonate particles is formed at 1 to 30 percent solids. A low-molecular-weight cationically charged aggregating agent is then added to the slurry to selectively aggregate fine and ultra-fine particles. The resultant aggregates are of larger mean particle size than the mixture of particles in the original slurry and contain little or no fine and colloidal particles. The net charge present on the aggregated particles is lower than that of the original mineral particles. The low solids suspension of the aggregated mineral particles is then dewatered, or increased in solids to form a slurry with a solids content greater than 60 percent by weight.

31 Claims, 7 Drawing Sheets

CALCIUM CARBONATE PIGMENTS FOR COATING PAPER AND PAPER BOARD

FIELD OF THE INVENTION

The present invention concerns a method for forming pigments for coating cellulosic products and products made using the pigments.

BACKGROUND TO THE INVENTION

Mineral pigments such as kaolin, calcium carbonate, talc and titanium dioxide are often used for coating paper and paper board. Aqueous slurries of mixtures of some or all of these minerals are applied to the paper or paper board surface as a "coating color." When the coating dries it provides improved surface properties such as enhanced smoothness and gloss. Typically coatings are applied at high machine speeds that necessitate rapid drying of the applied coating color. Thus, the coating pigment should preferably possess good high-shear rheological properties.

The properties which render a mineral, or pigment, of value as a coating pigment are low abrasion, high brightness and opacifying characteristics. The low abrasion is significant in order to assure that the resultant paper product can be manufactured with conventional machinery. The brightness and opacifying characteristics are important in producing quality cellulosic products. Good quality cellulosic products incorporate whiteness, high opacity, and an optimum bulk/weight ratio.

The brightness and opacifying characteristics of a pigment when coated on a sheet of paper, may be quantitatively related to a property of the pigment identified as the "scattering coefficient, S". The scattering coefficient, S, of a given pigment is well known in the art.

Titanium dioxide, with a blocky or rhombohedral particle morphology is amenable to high solids slurries. However, titanium dioxide is expensive. Titanium dioxide, can be incorporated into the paper coating formulation in the form of anatase or rutile and has a higher refractive index than other naturally occurring minerals. It is also very abrasive. Less expensive and more satisfactory replacements are sought.

Aluminosilicate pigments such as kaolin and talc are pigments that enhance the gloss of a sheet of paper at relatively low coat weights. But, these materials have a platy morphology which restricts their use in high solids coatings. The porous nature of calcined clays results in mineral slurries that are dilatant at high solids content. These pigments cannot be dispersed at high solids and have poor high-shear rheology.

The inorganic materials valuable as pigments typically are mixtures of particles that have a significant portion of the mineral particulates in the fine and ultra-fine range (i.e., particles having equivalent spherical diameters of less than about 0.5 μm). Fine and ultra-fine mineral particles are not useful in coating materials for cellulosic products as such small particles do not scatter light sufficiently to aid in the opacity and are not retained well on the surface of a sheet of paper or paperboard, but instead migrate down into the paper fiber web.

SUMMARY OF THE INVENTION

The present invention concerns a method for forming pigments for coating cellulosic products, such as paper and paper board. The method, and products made by the method, address many of the shortcomings of known coating pigments.

In general, the method comprises first providing an aqueous slurry comprising from about 1 percent to about 30 percent solid mineral particles by weight. Best results are achieved when using mineral suspensions comprising ground natural calcium carbonate or synthetically precipitated calcium carbonate or mixtures thereof which have low abrasion characteristics and are relatively inexpensive.

Preferably, at least 30 percent by weight of the mineral particles have an equivalent spherical diameter of less than about 2 microns. For best results, at least about 60 percent by weight of the mineral particles will have an equivalent spherical diameter of less than about 2 microns. As used herein, the terms "particle size" and "equivalent spherical diameter" refer to the particle size reading obtained from measuring mineral particle size with a Micromeritics SEDI-GRAPH® Model 5100 particle size analyzer.

The invention is practiced by using an anionically dispersed suspension of mineral particles, wherein the dispersed suspension possesses a bulk negative charge. An anionically dispersed mineral slurry can be purchased as a dispersed slurry, and such a slurry is used for working embodiments of the present invention. Alternatively, an anionic dispensed mineral slurry can be found by combining water, calcium carbonate particles, and a dispersing agent. The anionic dispersing agent generally is selected from the group consisting of homopolymers or copolymers of carboxylic acid containing vinyl monomers, homopolymers or copolymers of sulfonic acid containing vinyl monomers, polyacrylic acid homopolymers, polyacrylic acid copolymers, methacrylic acid, and mixtures thereof, with polyacrylic acid being a currently preferred anionic dispersing agent.

A low-molecular-weight cationically charged aggregating agent is then added to the anionically dispersed aqueous slurry in an amount sufficient to selectively aggregate fine particles (particles having an equivalent spherical diameter of less than about 0.5 microns) and ultra-fine particles (particles having an equivalent spherical diameter of less than about 0.2 microns) present in the slurry.

"Low-molecular-weight" aggregating agents useful for practicing the present invention typically have molecular weights, without limitation, of from about 10,000 to about 500,000. The aggregating agent is selected to have a charge opposite the bulk charge of the slurry and is thus, cationically charged.

As used herein, the phrase "selective aggregation" refers to a change in particle size distribution of the dispersed mineral slurry (i.e. aggregating the fine particles without also aggregating particles of other sizes. This change in particle size distribution occurs upon addition of the selective aggregating agent because the combined weight of all particles having diameters of less than 0.5 microns is reduced to be below about 30 percent of the total weight of mineral particles in the slurry. For best results, selective aggregation reduces the weight fraction of particles measuring less than 0.5 micron in diameter to be below about 10 percent of the total weight of mineral particles in the suspension. The phrase "non-selective aggregation" refers to a composition in which the combined weight of fine particles having diameters of less than 0.5 micron is not reduced to be less than 30 percent of the total weight of mineral particles in the suspension.

The low-molecular-weight selective aggregating agent generally is selected from the group consisting of poly(alkyl diallyl) quaternary ammonium salts; quaternary ammonium cationic polymers obtained by copolymerizing aliphatic secondary amines with epichlorohydrin; poly (quaternary ammonium) polyether salts that contain quaternary nitrogen in a polymeric backbone chain extended by ether groups; polyamines; copolymers of acrylamide with cationic vinyl monomers; dimethylamine epichlorohydrin copolymers; dimethyldiallylammonium chloride homopolymer; dimethyldiallylammonium chloride copolymer; divalent metal ion salts; trivalent metal ion salts; polyethyleneimine polyelectrolytes. The currently preferred low-molecular-weight selective aggregating agent is dimethyldiallylammonium chloride homopolymer.

Divalent metal ion salts useful as selective aggregating agents may be selected from the group of salts consisting of calcium, magnesium, nickel, manganese, copper, zinc and tin salts, and mixtures thereof. For example, the divalent metal ion salt may be selected from the group of salts consisting of magnesium chloride, calcium chloride, magnesium hydroxide, calcium hydroxide, magnesium nitrate, calcium nitrate, and mixtures thereof. The trivalent metal ion salt generally is selected from the group of salts consisting of aluminum, iron, chromium and titanium salts, and mixtures thereof. For example, the trivalent metal ion salt may be selected from the group consisting of aluminum sulphate, polyaluminum chloride, sodium aluminate, and mixtures thereof.

The amount of the cationically charged selective aggregating agent added to the anionically dispersed suspension may vary, and is best determined by considering the characteristics desired in the suspension and the cost of the aggregating agent. However, by way of example, the cationically charged selective aggregating agent may be added in an amount of from 5 lbs/ton to about 50 lbs/ton of mineral particles and preferably from 5 lbs/ton to about 20 lbs/ton. However, with some selective aggregating agents, there is little benefit realized from adding amounts greater than about 20 lbs/ton.

A working embodiment of the method for producing the coating comprises first providing an anionically dispersed aqueous slurry comprising from about 1 percent to about 15 percent ground natural calcium carbonate or synthetically precipitated calcium carbonate. Best results are achieved when the aqueous slurry comprises from about 1 percent to about 20 percent by weight ground natural calcium carbonate or synthetically precipitated calcium carbonate. The slurry can be purchased as an anionically dispersed slurry, or the method may include the step of adding an anionic dispersing agent to a mineral suspension. A concentrated slurry of from about 70% to about 76% may be shipped to the paper mill and diluted at the mill to the preferred range.

The slurry is then selectively aggregated with a cationic, low-molecular-weight selective aggregating agent. Five lbs/t to about twenty lbs/t of the aggregating agent is added to the dispersed aqueous slurry to selectively aggregate fine and ultra-fine particles present in the slurry. The slurry dewatered to form a concentrated slurry having a solids content of at least 60 percent by weight and applied to a surface of a sheet of cellulosic material. The sheet is then dried so that the aggregate particles are retained on the sheet.

The process of selectively aggregating the fine and ultra-fine particles in a mineral suspension produces aggregates having a larger mean particle size than the dispersed mineral slurry. Additionally, little or no fine or colloidal particles are free in suspension after aggregation. The net charge present on the aggregated particles is lower than that of the coating material. The mineral aggregates produced upon addition of the selective aggregating agent have a suitable size and surface charge to be retained well on the surface of a sheet of paper or paper board and do not migrate down into the fiber web.

Moreover, the mineral aggregates provide added bulk and enhanced opacity to the pigment coating on a sheet of paper or paperboard. The structured mineral pigments of the present invention are particularly useful in the pre-coating of cellulosic products such as recycled paper. Additionally, the products of this invention can be cost effectively manufactured on site at the paper mill from a high solids, dispersed mineral slurry.

DESCRIPTION OF PREFERRED EMBODIMENTS

Figure 1:
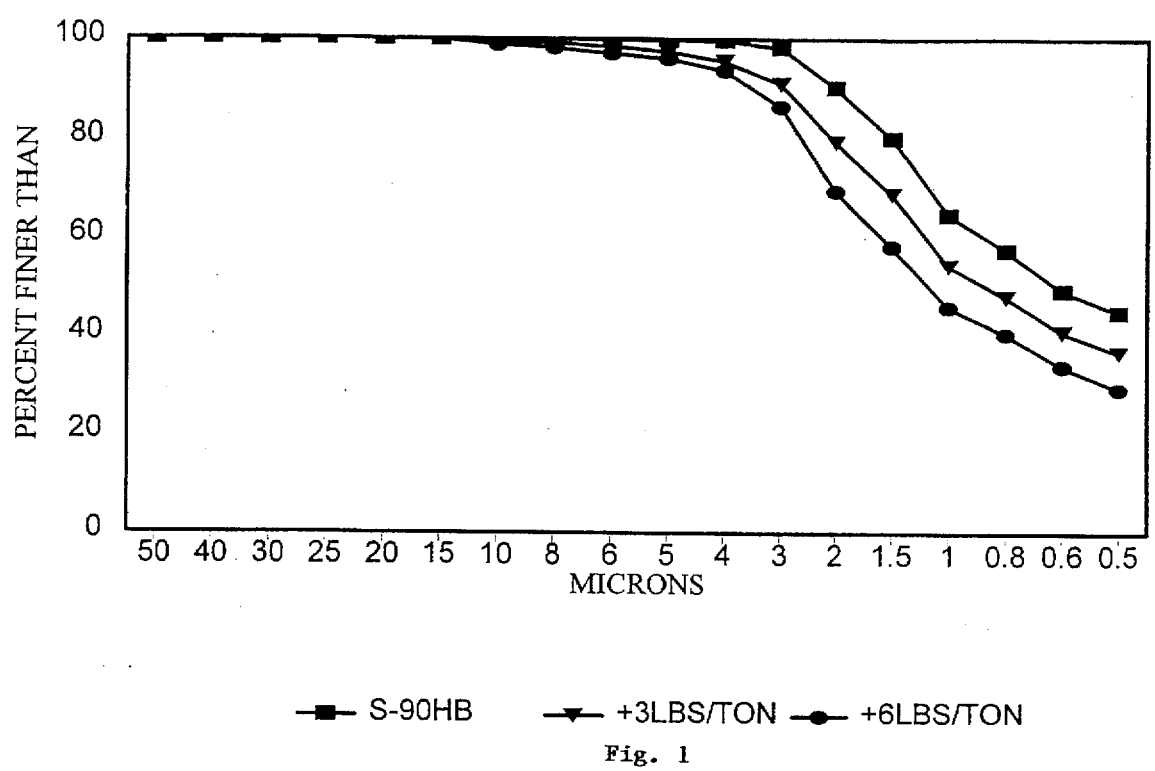
FIG. 1 illustrates the expected effect of addition of various amounts of cationic potato starch, a high-molecular weight aggregating agent with a molecular weight of 3–3.5 million, on a 10 percent solids mineral slurry of Microna S-90 HB.

The present invention concerns pigments that are used to coat cellulosic products and methods for their production. The pigments are formed by selectively aggregating anionically dispersed aqueous suspensions of mineral particles.

I. Mineral Particle Slurries

Suitable minerals include naturally ground calcium carbonate, synthetically precipitated calcium carbonate and mixtures thereof. The minerals listed above are ground or formed into particles that are sufficiently small as to be useful in aqueous slurries for coating paper products. The mineral particles are combined with water to form a slurry.

The mineral slurries generally include calcium carbonate particles in a range of particle sizes. Typically the mixture of mineral particles includes "coarse particles" (particles having an equivalent spherical diameter of at least about 0.5 microns) and "fine particles" (particles having an equivalent spherical diameter of less than about 0.5 microns). Of the fine particles in such mixtures, typically some are "ultra-fine particles" (particles having an equivalent spherical diameter of less than about 0.2 microns). The mixtures are formed to contain particles that are sufficiently small in size to be useful as coating pigments for coating paper and paper board.

In such a slurry of ground mineral particles, wherein about sixty percent by weight of the particles are finer than two microns, about fifteen percent by weight of the particles are typically in the fines range. A mineral material with ninety percent by weight of particles having equivalent spherical diameters less than about two microns will typically have about forty percent by weight of particles in the fines range. The present invention is most useful when a mineral slurry contains at least thirty percent by weight of the particles having an equivalent spherical diameter of less than about two microns. The absolute value of the fines content of a given mineral slurry will necessarily depend upon the method of production and, typically, the fines content relates to the mean particle size (i.e., the particle size (or equivalent spherical diameter) at which 50 wt. % of the particles are finer than the other 50 wt. % of the particles)) of the mineral slurry.

Slurries having lower solids concentrations, such as from about 1 percent to about 30 percent, which have been produced on site at the paper mill, or at a central production facility and transported to the paper mill, are the best feed materials for practicing this invention. Slurries of these mineral particles can be shipped to paper mills at high solids concentration, such as from about 70% to about 76%, to provide an affordable supply of the mineral material.

The aqueous mineral slurry is diluted to have a solids range of from about one to about thirty percent by weight. Best results are achieved by diluting the aqueous mineral slurry from about one percent to about ten percent solids by weight to facilitate selective aggregation (i.e., aggregating the fine particles without also aggregating particles of other sizes) of the fine particles, which possess most of the available surface area.

II. Anionic Dispersion

The mineral slurries used to practice the invention are anionically dispersed. Anionically dispersed mineral suspensions can be purchased commercially from such vendors as Columbia River Carbonates of Woodland, Wash., U.S.A. Alternatively, anionic dispersing agents can be added to an aqueous mineral slurry to disperse the mineral particles.

Low solids mineral slurries may naturally carry a net negative surface charge, or may be dispersed with an anionic polyelectrolyte dispersant. The term "polyelectrolyte" (or "ionically charged agent") as used herein refers to a polymer or molecular species with a net positive or net negative charge. Anionically charged agents have an excess of electrons or electron density and have a net negative charge.

The anionic dispersing agents used to practice the present invention generally are polymers or copolymers of carboxylic or sulfonic acid containing vinyl monomers, such as acrylic acid and methacrylic acid. As used herein, the term "polymer" refers to macromolecules formed by the chemical union of five or more combining units called monomers. Also as used herein, the term "copolymer" refers to a polymer comprised of two or more dissimilar monomers, and the term "homopolymer" refers to synthetic or natural polymers formed from a single monomer. The homopolymers or copolymers used as anionic dispersing agents typically have molecular weights in the range of from about 1,000 to about 10,000, with a preferred molecular weight being 5,000.

For best results the anionic dispersing agents are homopolymers or copolymers comprising one or more of acrylic acid, methacrylic acid, carboxylic acid containing vinyl monomers and sulfonic acid containing vinyl monomers. The currently most preferred anionic dispersing agent is polyacrylic acid homopolymer.

The polymers of acrylic acid, methacrylic acid and carboxylic acid containing vinyl monomers may be represented by Formula (1):

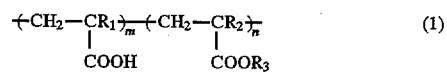
(1)

wherein $R_1$–$R_3$ are independently selected from the group consisting of hydrogen and lower alkyl groups, so that when $R_1$ is hydrogen and $R_2$ is a lower alkyl, these are acrylic acid copolymers, when R1 and $R_2$ are both hydrogen, these are acrylic acid homopolymers and when $R_1$ is a methyl group, these are methacrylic acid copolymers.

As used herein, the term "lower alkyl" refers to compounds having eight or fewer carbon atoms and includes both straight chain and branched chain compounds. The copolymers of sulfonic acid containing vinyl monomers may be represented by Formula (2):

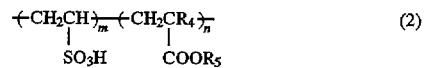
(2)

wherein $R_4$ and $R_5$ are independently selected from the group consisting of hydrogen and lower alkyl groups.

III. Aggregation

A low-molecular-weight cationically charged selective aggregating agent is added to the anionically dispersed mineral slurry to aggregate the fine particles. The cationic agent is added in an amount sufficient to cause the fine particles to selectively aggregate. Combinations of plural cationic aggregating agents, also can be used to aggregate the fines.

The amount of the selective aggregating agent added to the anionically dispersed mineral slurry varies depending upon factors such as the nature of the mineral particles used, the concentration of the mineral particles in the slurry and the nature of the aggregating agent. However, it appears that the best operation occurs with the addition of at least 5 lbs up to 50 lbs cationically charged aggregating agent per ton of mineral solids, preferably 5 lbs/ton to about 20 lbs/ton. Higher amounts can be used without detrimental effects. Best results are achieved by way of full selective aggregation when at least 5 lbs/ton selective aggregating agent with the best addition being 20 lbs/ton.

The following paragraphs discuss particular cationic aggregating agents that have been found to be useful in the practice of the invention. The particular aggregating agents discussed are intended to be illustrative only. It should be understood that any cationically charged aggregating agent of sufficiently low-molecular-weight, now known or hereinafter developed, can be used to practice the invention. However, the aggregating agents must selectively aggregate fine and ultra-fine mineral particles in the manner discussed herein, and must not detract from the use of the treated slurries for the production of cellulosic products.

The anionically dispersed mineral slurries used to practice the present invention are selectively aggregated using cationic polyelectrolytes of low-molecular-weight. Cationically charged agents have a deficiency of electrons or electron density and have a net positive charge.

The cationic aggregating agent preferably has a low-molecular-weight, such as from about 10,000 to 500,000, with from about 10,000 to 50,000 producing best results.

Water-soluble polymeric cationically charged agents are well known in the art. Generally, such materials do not contain negatively charged or electronically polarized groups, such as carboxyl or carbonyl groups.

One example of a class of cationic aggregating agents is poly (quaternary ammonium) compounds, such as poly (alkyl diallyl quaternary ammonium) salts. In addition to poly (alkyl diallyl quaternary ammonium) salts, other suitable quaternary ammonium cationic polymers can be obtained by copolymerizing aliphatic secondary amines with epichlorohydrin. Still other water-soluble cationic polyelectrolytes are poly (quaternary ammonium) polyether salts that contain quaternary nitrogen in a polymeric backbone and are chain extended by ether groups. These compounds are prepared from water-soluble poly (quaternary ammonium) salts containing pendant hydroxyl groups and bifunctionally reactive chain extending agents; such polyelectrolytes are prepared by treating an N,N,N,N-tetralkyl-hydroxyalkenediamine and an organic dihalide such as dihydroalkane or a dihaloether with an epoxy haloalkane. See U.S. Pat. No. 3,663,461 for the synthesis of poly (quaternary ammonium) polyether salts, which patent is incorporated herein by reference. Polyamines, copolymers of acrylamide with cationic vinyl monomers, dimethylamine, epichlorohydrin copolymers, dimethyldiallyammonium chloride homopolymers and copolymers, divalent and trivalent metal ion salts and polyethyleneimines are also currently preferred.

A. Alkyl Diallyl Quaternary Ammonium Salts

Polymers of alkyl diallyl quaternary ammonium salts may be represented by the Formula (3):

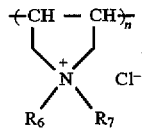

(3)

wherein $R_7$ and $R_7$ are independently selected from the group consisting of hydrogen, methyl groups, ethyl groups and lower alkyl groups. A preferred cationically charged agent is poly(dimethyldiallylammonium chloride), which is represented by the formula above when $R_6$ and $R_7$ are methyl groups.

A poly (dimethyldiallylammonium chloride) cationic polyelectrolyte commercially available under the trademark designation Agefloc WT50 SLV from the CPS Chemical Company, having a molecular weight estimated to be between 10,000 and 50,000, has been found to be particularly useful in the present invention. However, the invention is not limited to Agefloc WT50 SLV since other cationic polyelectrolytes appear to provide equivalent, if not superior results. Other cationic polyelectrolytes available from the CPS Chemical Company that have been shown to be useful in the present invention are: Agefloc WT 40 which has a molecular weight estimated to range from 200,000 to 400,000; Agequat C1405 which has a molecular weight estimated to range from 200,000 to 400,000; Agefloc B50 which has a molecular weight estimated to range from 10,000 to 50,000; and Agefloc A50 LV which has a molecular weight estimated to range from 200,000 to 400,000.

B. Poly (Quaternary Ammonium) Polyether Salts

Poly (quaternary ammonium) polyether salts that contain quaternary nitrogen in a polymeric backbone and are chain extended by ether groups may be represented by Formula (4):

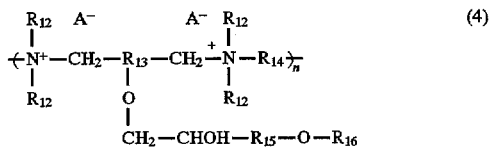

wherein $R_{12}$ is a lower alkyl group, $R_{13}$ is the residue of a hydroxy substituted lower alkylene group containing 10 or fewer carbon atoms, $R_{14}$ is an organic radical selected from the group consisting of alkylene groups containing four and fewer carbon atoms and a $(CH_2)_n$—O—$(CH_2)_3$ group where n is an integer from one to four, $R_{15}$ is an alkylene group containing one to four carbon atoms, $R_{16}$ is selected from the group consisting of terminal hydrogen and $R_3$, and A is an anion selected from the group consisting of chloride, bromide and iodide. For best results the polyether compounds described above would have a molecular weight in the range of 20,000 to 500,000.

C. Quaternary Ammonium Polymers from Secondary Amines Polymerized with Epichlorohydrin Polymers of quaternary ammonium monomers obtained by copolymerizing aliphatic secondary amines with epichlorohydrin may be represented by Formula (5):

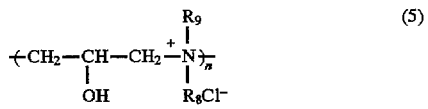

(5)

wherein $R_8$ and $R_9$ are independently selected from the group consisting of hydrogen, and lower alkyl groups. Another preferred polymeric cationic polyelectrolyte is polydimethylamine/epichlorohydrin copolymer represented by formula (5) when $R_8$ and $R_9$ are methyl groups.

D. Water-Soluble Polyamines

Other water-soluble cationic polyelectrolytes are polyamines which are usually supplied under commercial trade designations. Copolymers of acrylamide with cationic vinyl monomers or low-molecular-weight polyethyleneimine polyelectrolytes could also be used in this invention.

Suitable cationic polyelectrolyte polyamines may be represented by Formula (6):

(6)

wherein $R_{10}$ is selected from the group consisting of $NHR_2$ and $C(O)NHR_2$ and $R_{11}$ is selected from the group consisting of hydrogen and lower alkyls. Another preferred polymeric cationic polyelectrolyte is polyethyleneimine represented by the formula above when $R_{10}$ and $R_{11}$ are hydrogen. Another preferred polymeric cationic polyelectrolyte is polyacrylamide, represented by the formula above when $R_{10}$ is hydrogen and $R_{11}$ is $C(O)NH$. For best results the polyacrylamide polymer would have a molecular weight in the range of 20,000 to 500,000.

"Low-molecular-weight" as used in this context refers to molecular weights no greater than 500,000. Cationic potato starch is reported as having an estimated molecular weight of from about 3,000,000 to about 3,500,000, while corn starch is reported as having a molecular weight ranging from about 800,000 to about 1,800,000. Because of their high-molecular-weights, most such cationic polyelectrolytes are not preferred for use in the present invention as they do not selectively aggregate the fine particles to the extent necessary to produce a coating pigment with the characteristics described in the present invention. However, cationic starches, cationic guar gum, or other modified polysaccharides could act as preferred aggregating agents in this invention if they are of sufficiently low-molecular-weight.

E. Divalent and Trivalent Salts

Salts of divalent and trivalent metal ions, such as calcium, magnesium, iron and aluminum, also can be used as cationic aggregating agents. Examples of such salts include, but are not restricted to, calcium hydroxide, magnesium hydroxide, calcium nitrate, magnesium nitrate, magnesium chloride, aluminum sulphate (papermakers alum), sodium aluminate, polyaluminum chloride (PAC) and calcium chloride.

The pigment materials produced as discussed above are used in the fashion of prior pigment coating materials. For example, a pigment material according to the present invention can be applied to paper in the conventional manner of a standard paper coating slurry.

The following examples are intended to be illustrative of the invention only, and should not be interpreted to limit the invention to the particular features discussed therein.

The materials used to practice the following examples were selected from the following:

Mineral Particles

High solids fine ground calcium carbonate slurries, Microna S-80 B, Microna S-90 HB and Microna S-93 from Columbia River Carbonates of Woodland, Wash., U.S.A.

2. Anionic Dispersants

Acumer 9400, a polyacrylic acid homopolymer from Rohm & Hass Co. of Philadelphia, Pa., U.S.A.

3. Cationically Charged Agents

Dimethyldiallylammonium chloride homopolymer cationic polyelectrolytes Agefloc WT50 SLV, Agefloc WT40, dimethlydiallylammonium chloride copolymer Agequat C1405, and dimethylamine/epichlorohydrin copolymers Agefloc B50, Agefloc AS0 LV from the CPS Chemical Company, Inc. of Old Bridge, N.J., U.S.A.

4. Cationic Starch

Cationic potato starch, Westcat E-F, from Western Polymer Corporation of Longwood, Fla., U.S.A.

EXAMPLE 1

A sample of Microna S-90 HB, which is a commercially available, anionically dispersed, ground calcium carbonate paper coating pigment slurry containing 90 percent by weight of particles finer than 2 microns and 45 percent by weight of particles finer than 0.5 microns, is diluted to 10 percent solids by weight in water. To this mineral suspension is added, with stirring, a solution of 1 percent (weight/ weight in water) cationic potato starch, Westcat E-F, with an estimated molecular weight of 3,000,000 to 3,500,000. About 3 lbs/t and 6 lbs/t cationic starch to Microna S-90 HB (dry on dry) are added to the mineral slurry.

The particle surface charge of the anionically dispersed Microna S-90 HB mineral slurry is expected to be about −37 µeg/g. After treatment with 3 lbs/t of the cationic potato starch the mineral surface charge is expected to be reduced to about −12 µeg/g, and after treatment with about 6 lbs/t of the cationic potato starch the mineral surface charge is expected to be about −8 µeg/g.

FIG. 1 shows the expected impact of the cationic starch treatment on the particle size distribution of Microna S-90 HB as may be determined by a Micromeritics SEDIGRAPH® 5100 particle size analyzer. FIG. 1 demonstrates that as the amount of cationic starch increases general flocculation of all of the particles present in the mineral slurry can be expected to take place, with the particle size curve displaced to a higher mean particle size at higher cationic starch dose rates. At 6 lbs/t cationic starch treatment level it is expected that less than 30 percent by weight of particles having equivalent spherical diameters of at least about 0.5 microns will be present in the mineral slurry.

EXAMPLE 2

A sample of Microna S-80 B, which is a commercially available, anionically dispersed, ground calcium carbonate paper coating pigment slurry containing 80 percent by weight of particles finer than 2 microns and 40 percent by weight of particles finer than 0.5 microns, is diluted to a range of differing solids levels of 1 percent, 10 percent, 15 percent, 20 percent and 30 percent with water. To this mineral suspensions is added, with stirring, a solution of 1 percent (weight/weight in water) of the cationic selective aggregating agent Agefloc WT50 SLV which has an estimated molecular weight between 10,000 and 50,000. 5 lbs/t of Agefloc WT50 SLV is added to Microna S-80 B mineral particles.

Figure 2:
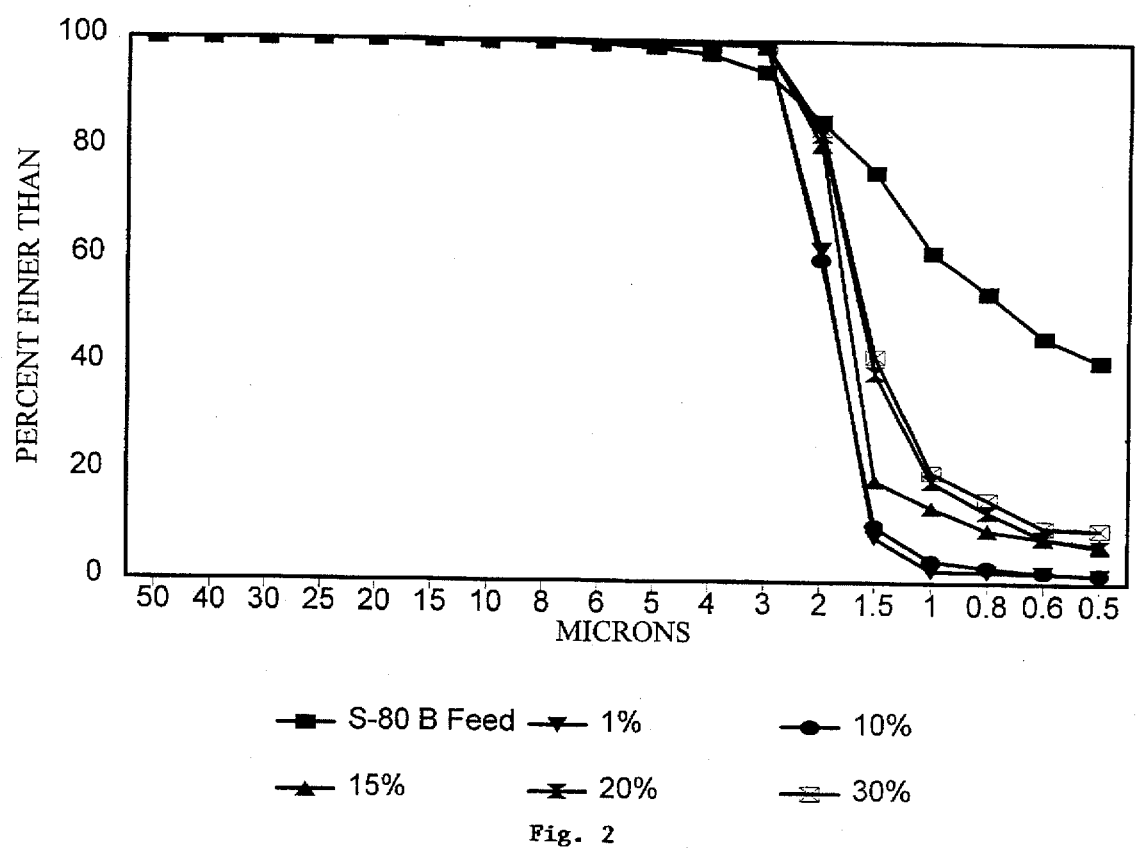
FIG. 2 illustrates the expected effect of differing mineral solids content on the aggregation of the fine particles present in a slurry of Microna S-80 B with the cationic polyelectrolyte Agefloc WT50 SLV.

FIG. 2 illustrates the expected results that addition of a low-molecular-weight cationic selective aggregating agent to the anionically dispersed mineral slurry results in selective aggregation of the fines particles in the slurry when the treatment is carried out at low solids. When the mineral slurry is 10 percent solids or lower prior to treatment with the low-molecular-weight cationically charged agent, complete aggregation of the fine particles present in the slurry is expected.

EXAMPLE 3

A sample of commercially available Microna S-90 HB anionically dispersed, ground calcium carbonate pigment slurry containing 90 percent by weight of particles finer than 2 microns and 45 percent by weight of particles finer than 0.5 microns, is diluted to 10 percent solids by weight in water. To this mineral suspension is added in separate experiments, with stirring, a solution of 1 percent (weight/ weight in water) of the cationic selective aggregating agents Agequat C1405, Agefloc B50, Agefloc WT40 and Agefloc A50 LV which have estimated molecular weights in the range 10,000 to 400,000. At least 5 lbs/t cationic selective aggregating agent is used for each treatment experiment.

Figure 3:
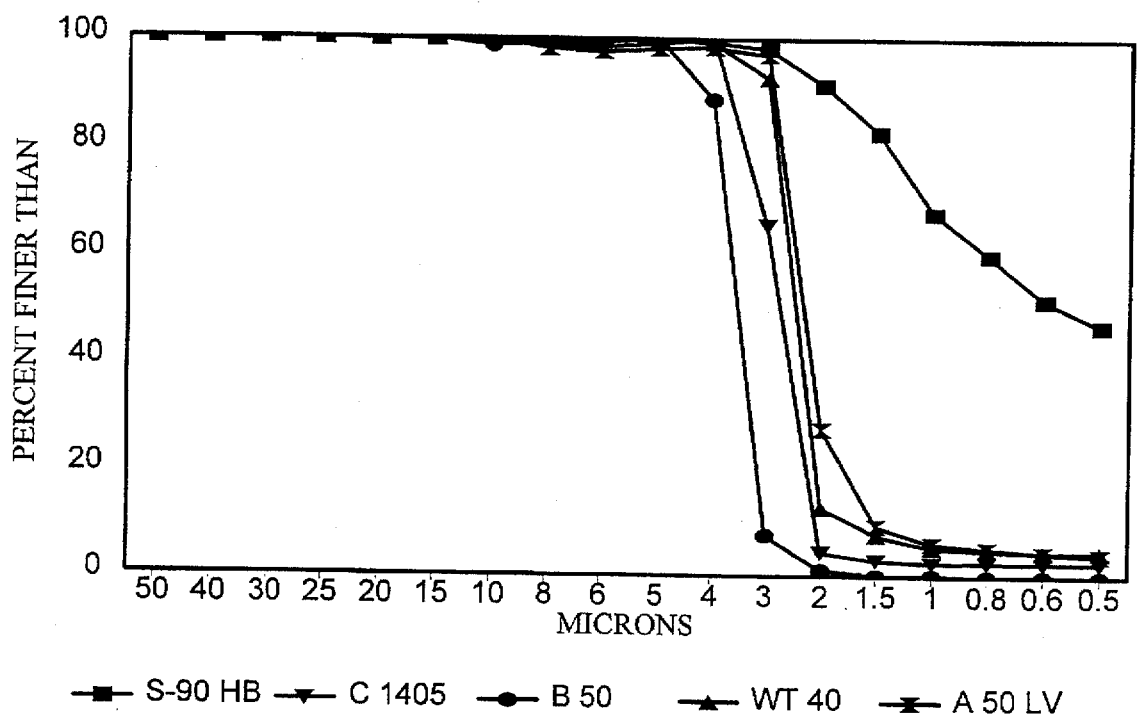
FIG. 3 illustrates the expected effect of 5 lbs/t addition of various cationically charged aggregating agents on the aggregation of the fine particles present in a 10 percent solids suspension of Microna S-90 HB.

FIG. 3 shows the expected impact of these cationic aggregating agent treatments on the particle size distribution of mineral particles in the slurry. All of the polymer treatments chosen are expected to selectively aggregate the fine mineral particles within the mineral slurry. The expected mean particle sizes of the aggregated slurries and surface charges of the aggregated slurries are listed in Table I.

TABLE I

| Polymer (5 lbs/t) | Surface Charge (µeg/g) | Mean Particle Size (Microns) |
| --- | --- | --- |
| None | −37 | 0.6 |
| Agequat C1405 | −11 | 2.8 |
| Agefloc B50 | −8 | 3.5 |
| Agefloc WT40 | −7 | 2.3 |
| Agefloc A50 LV | −8 | 2.3 |

EXAMPLE 4

Figure 4:
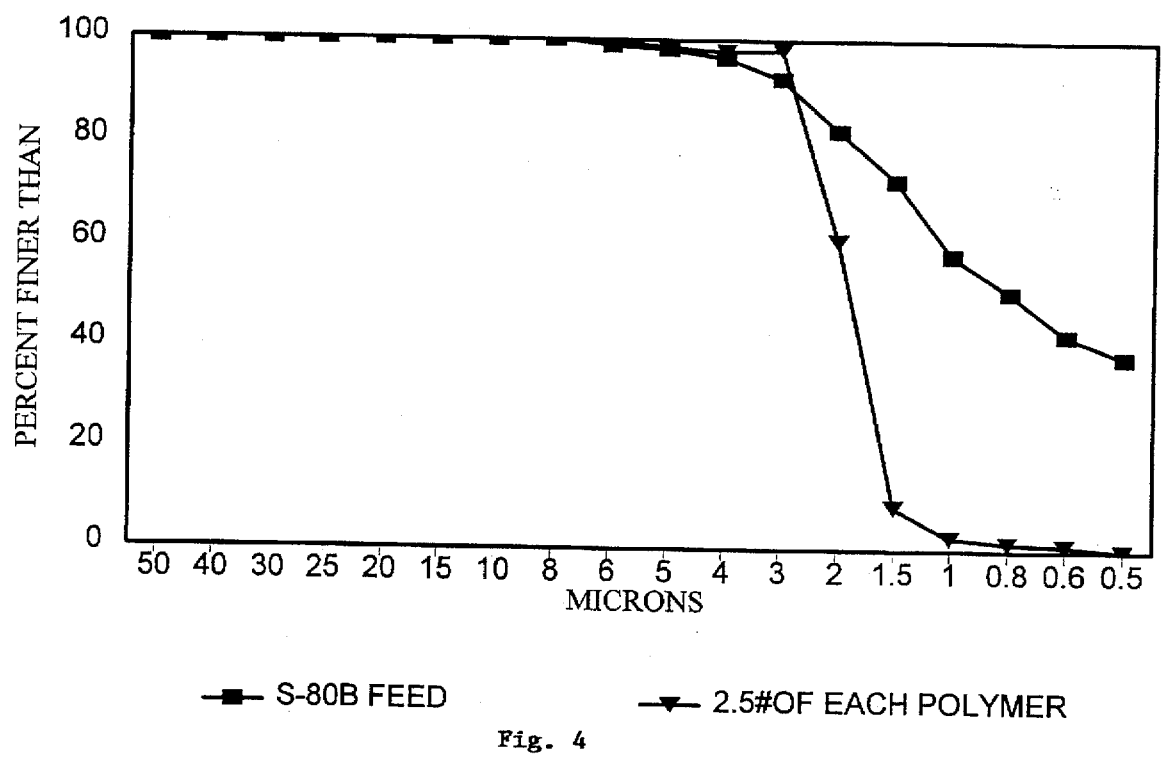
FIG. 4 illustrates the expected effect of addition of two different cationically charged aggregating agents on the aggregation of the fine particles present in Microna S-80 B.

To a mineral suspension composed of Microna S-80 B at 10 percent solids in water, containing 80 percent by weight of particles finer than two microns and 40 percent by weight of particles finer than 0.5 microns, is added, with stirring, about 2.5 lbs/t of a 1 percent solution of the cationic selective aggregating agent Agefloc WT50 SLV with 2.5 lbs/t of a 1 percent solution of the cationic selective aggregating agent Agefloc B50. FIG. 4 displays the expected results. Combinations of cationically charged agents are expected to result in a mineral particle slurry that is selectively aggregated.

EXAMPLE 5

A commercially available sample of Microna S-80 B anionically dispersed, ground calcium carbonate pigment slurry containing 80 percent by weight of particles finer than 2 microns and 40 percent by weight of particles finer than 0.5 microns, is diluted to 10 percent solids by weight. A solution of 1 percent (weight/weight in water) of alum is added to the mineral particle slurry. 5, 10, and 20 lbs/t alum to Microna S-80 B (dry on dry) are then added to each slurry sample.

Figure 5:
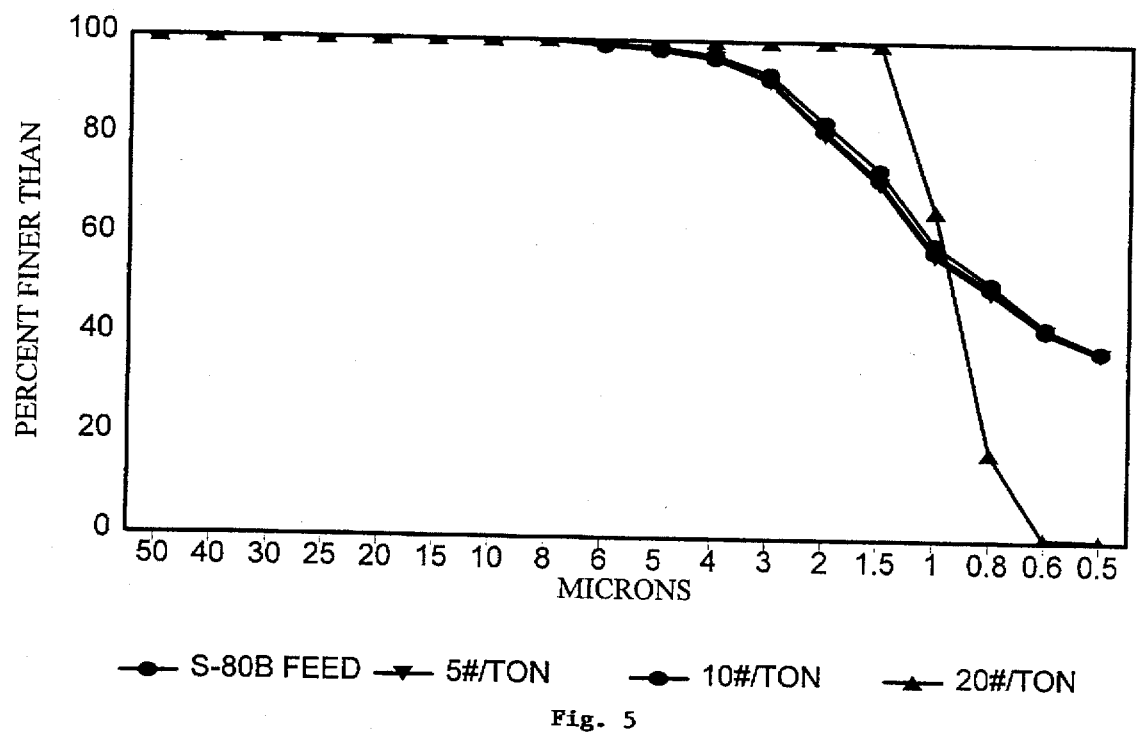
FIG. 5 illustrates the expected effect of adding various amounts of alum on the aggregation of the fine particles present in a 10 percent solids slurry of Microna S-80 B.

The expected results illustrated in FIG. 5, show the impact of the addition of alum on the particle size distribution of a Microna S-80 B mineral slurry. From this example it can be seen that at addition of about 20 lbs/t of aggregating agent, aggregation of the fine particles present in the mineral slurry is expected to take place such that no fine particles are present in the sample after the treatment process. The particle surface charge is expected to change from about −21 µeg/g for the mineral slurry Microna S-80 B to about +5 µeg/g for the aggregated slurry.

EXAMPLE 6

A commercially available sample of Microna S-90 HB anionically dispersed, ground calcium carbonate coating pigment slurry containing 90 percent by weight of particles finer than 2 microns and 45 percent by weight of particles finer than 0.5 microns, is diluted to about 10 percent solids by weight in water. To this mineral suspension is added, with stirring, a solution of 1 percent (weight/weight in water) of the cationic selective aggregating agent Agefloc WT50 SLV having an estimated molecular weight between 10,000 and 50,000. 5 lbs/t Agefloc WT50 SLV to Microna S-90 HB (dry-on-dry) is added to the mineral slurry.

The particle charge of the Microna S-90 HB mineral slurry is expected to be reduced from about −34 µeg/g to about −6 µeg/g with the addition of 5 lbs/t Agefloc WT50 SLV. The median particle diameter of the treated mineral slurry is expected to increase from about 0.6 microns for the mineral particle slurry to about 1.7 microns.

Figure 6:
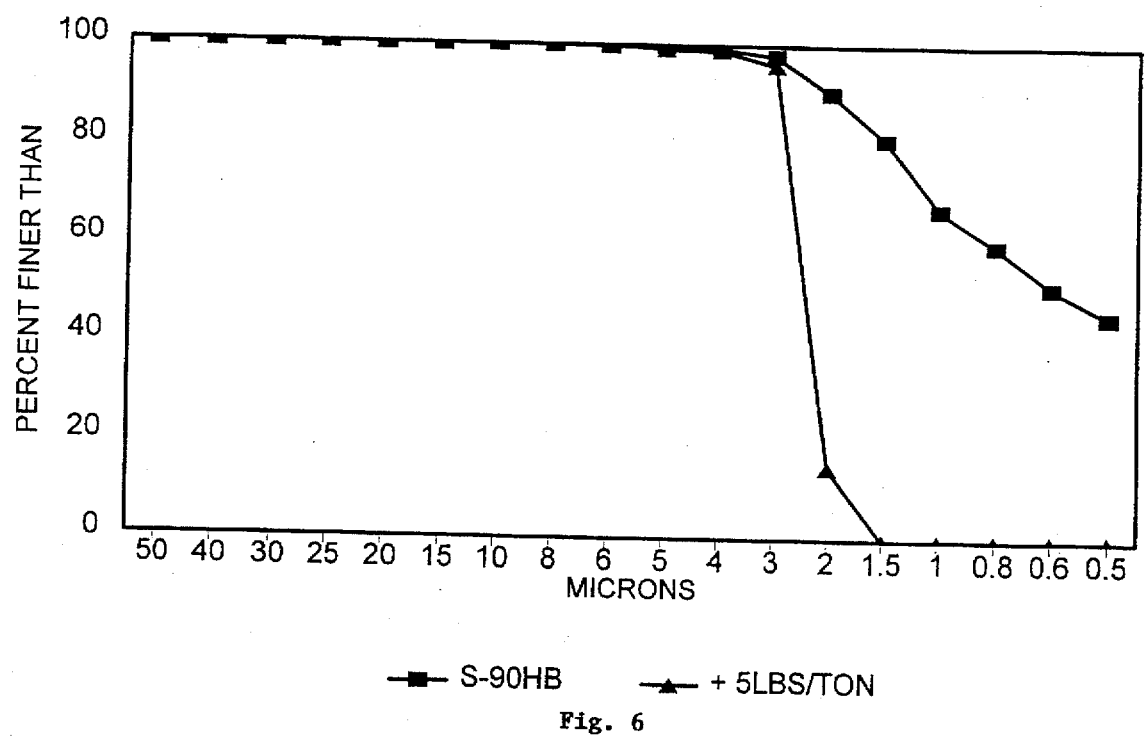
FIG. 6 illustrates the expected particle size distribute curve from addition of 5 lbs/t of the cationically charged aggregating agent Agefloc WT50 SLV to a slurry of Microna S-90 HB.

FIG. 6 shows the expected particle size curve of Microna S-90 HB after treatment with 5 lbs/t of Agefloc WT50 SLV.

As can be seen, treatment of the mineral slurry with the low-molecular-weight polyelectrolyte is expected to selectively aggregate the fine mineral particles present in the mineral slurry.

A large sample of the treated mineral slurry is dewatered with a laboratory centrifuge and re-slurried to form a pigment suspension with a solids content greater than 60 percent. This pigment is then incorporated into a paper coating formulation.

EXAMPLE 7

A commercially available sample of Microna S-93 anionically dispersed, ground calcium carbonate coating pigment slurry containing 95 percent by weight of particles finer than 2 microns and 47 percent by weight of particles finer than 0.5 microns, is diluted to about 10 percent solids by weight in water. To this mineral suspension is added, with stirring, a solution of 1 percent (weight/weight in water) of the cationic selective aggregating agent Agefloc WT50 SLV which has an estimated molecular weight between 10,000 and 50,000. 5 lbs/t Agefloc WT50 SLV to Microna S-93 is added to the mineral slurry.

The particle charge of the Microna S-93 mineral slurry is expected to be reduced from about −38 µeg/g to about −21 µeg/g with the addition of 5 lbs/t Agefloc WT50 SLV. The median particle diameter of the treated mineral slurry is expected to increase from about 0.6 microns for the mineral particle slurry to about 1.6 microns.

Figure 7:
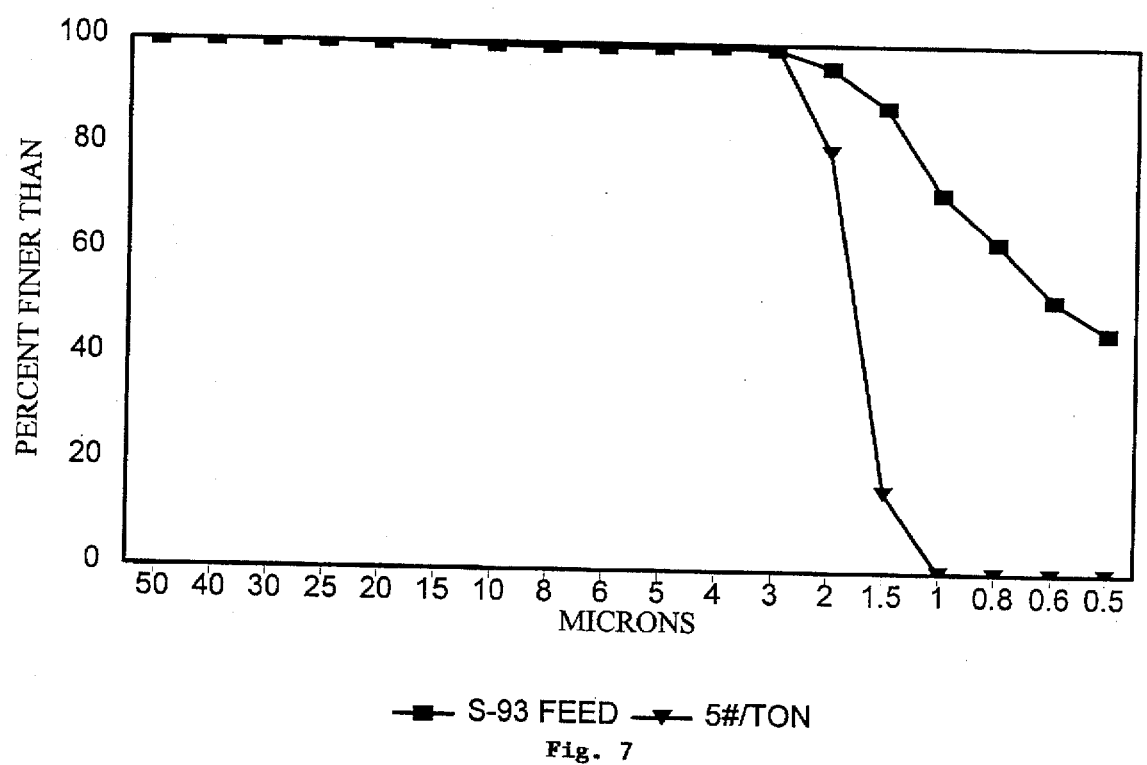
FIG. 7 illustrates the expected particle size distribute curve from addition of 5 lbs/t of the cationically charged aggregating agent Agefloc WT50 SLV on the particle size distribution of Microna S-93.

FIG. 7 shows the expected particle size curve of Microna S-93 after treatment with 5 lbs/t of Agefloc WT50 SLV. Treatment of the mineral slurry with at least 5 lbs of the low-molecular-weight cationically charged agent per ton of mineral particles is expected to selectively aggregate the fine particles present in the mineral slurry.

A large sample of the treated mineral slurry may be dewatered with a laboratory centrifuge and re-slurried to form a pigment suspension with a solids content greater than 60 percent. This pigment is then incorporated into a paper coating formulation.

The present invention has been described in connection with preferred embodiments and multiple examples. It will be understood that the invention is not limited to those embodiments. On the contrary, the invention covers all alternatives, modifications, and equivalents as may be included within the spirit and scope of the invention as defined by the following claims.

I claim:

1. A method for producing pigments for coating cellulosic products, comprising:
   providing an anionically dispersed aqueous slurry comprising from about 1 percent to about 30 percent solid mineral particles by weight, the dispersed slurry having fine and ultra-fine particles and a bulk negative charge; and
   adding at least 5 pounds of a low-molecular weight cationically charged aggregating agent per ton of mineral particles to the anionically dispersed aqueous slurry to selectively aggregate the fine and ultra-fine particles present in the dispersed slurry.

2. The method of claim 1 wherein the mineral particles are selected from the group consisting of ground natural calcium carbonate, synthetically precipitated calcium carbonate and mixtures thereof.

3. The method of claim 1 wherein the slurry of anionically dispersed mineral particles is from about 1 percent to about 20 percent solids by weight.

4. The method of claim 1 wherein the slurry of anionically dispersed mineral particles is about 1 percent to about 10 percent solids by weight.

5. The method of claim 1 wherein the dispersed slurry of mineral particles is anionically dispersed with a compound selected from the group consisting of a poly acrylic acid copolymer, poly acrylic acid homopolymer, methacrylic acid and mixtures thereof.

6. The method of claim 1 wherein the dispersed slurry of mineral particles is anionically dispersed with a compound selected from the group consisting of a polycarboxylic acid containing vinyl monomer, a polysulfonic acid containing vinyl monomer and mixtures thereof.

7. The method of claim 1 wherein the dispersed slurry of mineral particles is anionically dispersed with a compound comprising polyacrylic acid.

8. The method of claim 1 wherein the low molecular weight cationically charged aggregating agent is selected from the group consisting of alkyl diallyl quaternary ammonium salts, quaternary ammonium cationic polymers obtained by copolymerizing aliphatic secondary amines with epichlorohydrin, poly (quaternary ammonium) polyether salts that contain quaternary nitrogen in a polymeric backbone chain extended by ether groups, polyamines, copolymers of acrylamide with cationic vinyl monomers, dimethylamine epichlorohydrine copolymers, dimethyldiallylammonium chloride homopolymer, dimethyldiallylammonium chloride copolymer, divalent metal ion salt, trivalent metal ion salt or polyethyleneimine polyelectrolytes and mixtures thereof.

9. The method of claim 1 wherein the low-molecular weight cationically charged aggregating agent comprises dimethyldiallylammonium chloride homopolymer.

10. The method of claim 8 wherein the divalent metal ion salt is selected from the group consisting of calcium, magnesium, nickel, manganese, copper, zinc and tin salts and mixtures thereof.

11. The method of claim 8 wherein the divalent metal ion salt is selected from the group consisting of magnesium chloride, calcium chloride, magnesium hydroxide, calcium hydroxide, magnesium nitrate and calcium nitrate.

12. The method of claim 8 wherein the trivalent metal ion salt is selected from the group consisting of aluminum, iron, chromium and titanium salts and mixtures thereof.

13. The method of claim 8 wherein the trivalent metal ion salt is selected from the group consisting of aluminum sulphate, polyaluminum chloride, aluminum nitrate and sodium aluminate and mixtures thereof.

14. The method of claim 1 wherein 5 to about 15 pounds of the cationically charged aggregating agent per ton mineral particles is added to the anionically dispersed slurry of mineral particles.

15. The method of claim 1 wherein the low-molecular-weight cationically charged aggregating agent has a molecular weight from about 10,000 to about 50,000.

16. A method for producing pigments for coating paper and paper board, comprising:
providing an aqueous slurry comprising from about 1 percent to about 30 percent solids by weight of mineral particles, the mineral particles being selected from the group consisting of ground natural calcium carbonate, synthetically precipitated calcium carbonate and mixtures thereof;
adding an anionic dispersing agent in the slurry to anionically disperse the mineral particles, thereby producing an anionically dispersed aqueous suspension of mineral particles, the anionically dispersed aqueous suspension having a bulk negative charge; and
adding a cationically charged low-molecular-weight aggregating agent to the anionically dispersed aqueous suspension in an amount of at least 5 pounds aggregating agent per ton of mineral particles to selectively aggregate the fine and ultra-fine particles present in the anionically dispersed aqueous slurry.

17. The method of claim 16 wherein the anionically dispersed aqueous suspension comprises from about 1 percent to about 10 percent solids by weight.

18. The method of claim 16 wherein the anionic dispersing agent comprises polyacrylic acid.

19. A method for producing pigments for coating paper and paper board, comprising:
providing an anionically dispersed aqueous slurry comprising from about 1 percent by weight to about 15 percent by weight ground natural calcium carbonate, synthetically precipitated calcium carbonate or mixtures thereof; and
adding at least 5 lbs of a cationically charged aggregating agent per ton of calcium carbonate to the anionically dispersed aqueous slurry to selectively aggregate fine and ultra-fine particles present in the anionically dispersed aqueous slurry, the aggregating agent being selected from the group consisting of alkyl diallyl quaternary ammonium salts, quaternary ammonium cationic polymers obtained by copolymerizing aliphatic secondary amines with epichlorohydrin, poly (quaternary ammonium) polyether salts that contain quaternary nitrogen in a polymeric backbone chain extended by ether groups, polyamines, copolymers of acrylamide with cationic vinyl monomers, dimethylamine epichlorohydrine copolymers, dimethyldiallylammonium chloride homopolymer, dimethyldiallylammonium chloride copolymer, divalent metal ion salt, trivalent metal ion salt or polyethyleneimine polyelectrolytes and mixtures thereof.

20. The method of claim 19 wherein the step of providing an anionically dispersed aqueous slurry comprises adding an anionic dispersing agent to a suspension of ground natural calcium carbonate, synthetically precipitated calcium carbonate, or mixtures thereof.

21. The method according to claim 19 wherein the anionically dispersed aqueous slurry comprises from about 1 percent to about 10 percent ground natural calcium carbonate or synthetically precipitated calcium carbonate by weight.

22. The method of claim 19 wherein the low-molecular-weight cationically charged aggregating agent comprises dimethyldiallylammonium chloride homopolymer.

23. A method for producing pigments for coating paper and paper board, comprising:
providing an anionically dispersed aqueous slurry comprising from about 1 percent to about 10 percent ground natural calcium carbonate, synthetically precipitated calcium carbonate and mixtures thereof; and
adding at least 5 lbs of dimethyldiallylammonium chloride homopolymer per ton of calcium carbonate to the anionically dispersed aqueous slurry to selectively aggregate fine and ultra-fine particles present in the anionically dispersed aqueous slurry.

24. A pigment for coating paper or paper board, the pigment being produced according to the process of claim 1.

25. A pigment for coating paper or paper board, the pigment being produced according to the process of claim 16.

26. A pigment for coating paper or paper board, the pigment being produced according to the process of claim 19.

27. An aqueous pigment suspension for coating paper or paper board, the suspension being made according to the steps comprising:

provinding an anionically dispersed aqueous slurry having coarse, fine and ultra-fine particles, the dispersed aqueous slurry comprising from about 1 percent to about 15 percent ground natural calcium carbonate, synthetically precipitated calcium carbonate or mixtures thereof; and adding at least 5 lbs of dimethyldiallylammonium chloride homopolymer per ton of calcium carbonate to the dispersed aqueous slurry to selectively aggregate fine and ultra-fine particles present in the dispersed aqueous slurry.

28. An aqueous pigment suspension for coating paper or paper board, the suspension comprising:

water; and from about 1 percent to about 15 percent solid mineral particles by weight, the mineral particles comprising both fine and coarse particles that are composed of a material selected from the group consisting of ground natural calcium carbonate, synthetically precipitated calcium carbonate and mixtures thereof, wherein at least a portion of the fine particles are contained in aggregate particles that have an equivalent spherical diameter of at least 0.5 microns and wherein particles having diameters of less than 0.5 microns comprise less than about 30 percent of the total weight of all particles in the suspension.

29. An aqueous pigment suspension for coating paper or paper board, the suspension comprising: water; and from about 1 percent to about 15 percent solid mineral particles by weight selected from the group consisting of ground natural calcium carbonate, synthetically precipitated calcium carbonate and mixtures thereof, wherein the mineral particles have been selectively aggregated.

30. A process for coating paper or paper board, the process comprising:

providing an anionically dispersed aqueous slurry comprising from about 1 percent to about 30 percent solid mineral particles by weight, the slurry containing fine and ultra-fine particles and having a bulk negative charge;

adding at least 5 lbs of a cationically charged low-molecular-weight aggregating agent per ton of mineral particles to the anionically dispersed aqueous slurry to selectively aggregate the fine and ultra-fine particles and form a slurry containing aggregate particles;

dewatering the slurry containing the aggregate particles to form a concentrated slurry having a solids content of at least 60 percent by weight;

applying the concentrated slurry to a surface of a sheet of cellulosic material; and drying the sheet so that the aggregate particles are retained on the sheet.

31. A process for coating paper or paper board, the process comprising:

providing a concentrated aqueous slurry comprising more than 30 percent mineral particles by weight;

shipping the concentrated slurry from a central manufacturing location to the site of a paper mill;

providing an anionic dispersing agent to the aqueous slurry, before or after the shipping, to form an anionically dispersed aqueous slurry;

at the site of the paper mill, adding water, before or after the dispersing agent is provided in the aqueous slurry, to form a dilute anionically dispersed aqueous slurry comprising from about 1 percent to about 30 percent mineral particles by weight;

adding at least 5 pounds of a low-molecular-weight cationic aggregating agent per ton of mineral particles to the dilute slurry to selectively aggregate fine and ultra-fine mineral particles and form aggregated particles;

dewatering the slurry containing the aggregate particles to form a concentrated slurry having a solids content of at least 60 percent by weight;

applying the concentrated slurry to a surface of a sheet of cellulosic material; and drying the sheet so that the aggregate particles are retained on the sheet.

* * * * *

UNITED STATES PATENT AND TRADEMARK OFFICE
CERTIFICATE OF CORRECTION

PATENT NO. : 5,676,747

DATED : October 14, 1997

INVENTOR(S) : Alan J. Brown

It is certified that error appears in the above-identified patent and that said Letters Patent is hereby corrected as shown below:

Column 2, line 50, "sizes." should be --sizes).--;

Column 5, line 22, "far" should be --for--;

Column 7, line 40, "$R_7$ and $R_7$" should be --$R_6$ and $R_7$--;

Column 8, line 17, "$R_3$" should be --$R_{13}$--

Signed and Sealed this

Fifteenth Day of December, 1998

Attest:

*Attesting Officer*

BRUCE LEHMAN

*Commissioner of Patents and Trademarks*